United States Patent
Xi et al.

(10) Patent No.: US 7,646,163 B2
(45) Date of Patent: Jan. 12, 2010

(54) DEVICE FOR CONTROLLING ROTATION SPEED OF COMPUTER FAN

(75) Inventors: Chun-Fang Xi, Shenzhen (CN); Ning Wang, Shenzhen (CN); Hua Zou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 119 days.

(21) Appl. No.: 12/052,748

(22) Filed: Mar. 21, 2008

(65) Prior Publication Data

US 2009/0208192 A1   Aug. 20, 2009

(30) Foreign Application Priority Data

Feb. 18, 2008   (CN) .......................... 2008 1 0300344

(51) Int. Cl.
G05B 11/28 (2006.01)
(52) U.S. Cl. ...................... 318/599; 318/811
(58) Field of Classification Search ................ 318/599, 318/811, 461, 432, 434

See application file for complete search history.

(56) References Cited

U.S. PATENT DOCUMENTS

| | | | | |
|---|---|---|---|---|
| 6,954,684 | B2 * | 10/2005 | Frankel et al. | 700/300 |
| 7,075,261 | B2 * | 7/2006 | Burstein | 318/400.11 |
| 2006/0013571 | A1 * | 1/2006 | Squibb | 388/804 |
| 2007/0019934 | A1 * | 1/2007 | Ku | 388/811 |

* cited by examiner

*Primary Examiner*—Rina I Duda
(74) *Attorney, Agent, or Firm*—Frank R. Niranjan

(57) ABSTRACT

An exemplary device for controlling rotation speed of a computer fan includes an identifying device and a control circuit. The identifying device is configured for identifying the type of the computer fan. The control circuit configured for controlling rotation speed of the computer fan includes an electric switch, an integrated circuit, a first output terminal, and a second output terminal. The electric switch has a first terminal coupled to the identifying device to receive an identifying signal, a second terminal coupled to a super I/O chip to receive a PWM signal. The integrated circuit is configured to convert the PWM signal to an analog voltage signal. The first output terminal is configured to output the PWM signal to a PWM control pin of a fan header. The second output terminal is configured to output the analog voltage signal to a power pin of the fan header.

11 Claims, 3 Drawing Sheets

DEVICE FOR CONTROLLING ROTATION SPEED OF COMPUTER FAN

BACKGROUND

1. Field of the Invention

The present invention relates to computer fans, and particularly to a device for controlling rotation speed of a computer fan.

2. Description of Related Art

Generally, a computer system includes a motherboard with various chips such as a central processing unit (CPU) mounted thereon, a storage device such as a hard disc, and input/output devices. Many of these devices generate heat when the computer system is operating, particularly the CPU. If the heat generated from the CPU is not dissipated in a timely fashion, it may damage the CPU or even other parts of the computer system.

Typically, a sensor is programmed to be used as a temperature detector for detecting temperature of the CPU. A computer fan is used to facilitate removal of heat to keep the temperature of the CPU within a safe temperature range. A fan controller is provided to adjust fan speed to be more energy efficient while still providing enough heat dissipation. The computer fan includes 3-pin fans, which can be adjusted by a voltage signal and 4-pin fans, which can be adjusted by a pulse-width modulation (PWM) signal controlled by a basic input/output system (BIOS) of the motherboard.

In a 3-pin fan motherboard, a 3-pin fan is connected to the motherboard by a 3-pin fan header mounted on the motherboard, and a 3-pin fan controller is used to provide the voltage signal to the 3-pin fan for adjusting the rotation speed of the 3-pin fan. In a 4-pin fan motherboard, a 4-pin fan is connected to the motherboard by a 4-pin fan header mounted on the motherboard, and a 4-pin fan controller is used to provide the PWM signal to the fourth pin of the 4-pin fan for adjusting the rotation speed of the 4-pin fan. In theory, the 3-pin fan can be connected to the 4-pin fan motherboard by the 4-pin fan header. However, the 3-pin fan cannot be controlled by the 4-pin fan controller because the 3-pin fan does not have the fourth pin and cannot receive the PWM signal from the 4-pin fan controller. Therefore, the CPU of the 4-pin fan motherboard may be damaged because the heat may not be dissipated properly.

What is needed, therefore, is to provide a device which can identify the type of a computer fan in use and adjust the rotation speed of the computer fan, whether it be a 3-pin fan or a 4-pin fan.

SUMMARY

An exemplary device for controlling rotation speed of a computer fan includes an identifying device and a control circuit. The identifying device configured for identifying the type of the computer fan, includes a switch having a control terminal and a ground terminal, the control terminal connected to a power supply via a resistor, the ground terminal grounded. The control circuit configured for controlling rotation speed of the computer fan includes an electric switch, an integrated circuit, a first output terminal, and a second output terminal. The electric switch has a first terminal coupled to a node between the first resistor and the control terminal to receive an identifying signal generated by the identifying device, a second terminal coupled to a super input/output (I/O) chip to receive a pulse-width modulation (PWM) signal, and a third terminal. The integrated circuit has an input terminal connected to the third terminal of the electric switch, and an output terminal configured to output an analog voltage signal. The first output terminal is connected to the super I/O chip, and is configured to output the PWM signal to a PWM control pin of a fan header. The second output terminal is configured to output the analog voltage signal to a power pin of the fan header.

Other novel features and advantages will become more apparent from the following detailed description of preferred and exemplary embodiments when taken in conjunction with the accompanying drawings, in which:

DETAILED DESCRIPTION

Figure 1:
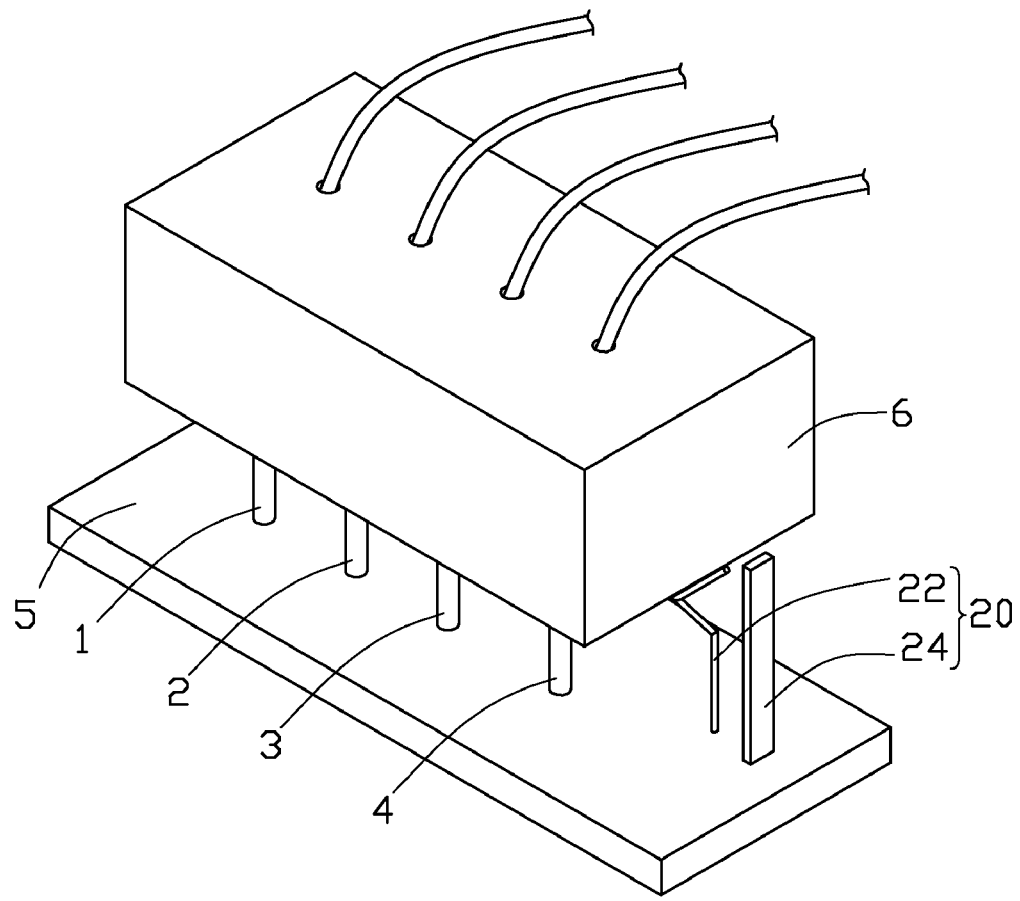
FIG. 1 is an isometric view of a switch installed on a 4-pin fan header in accordance with an embodiment of the present invention.
Figure 2:
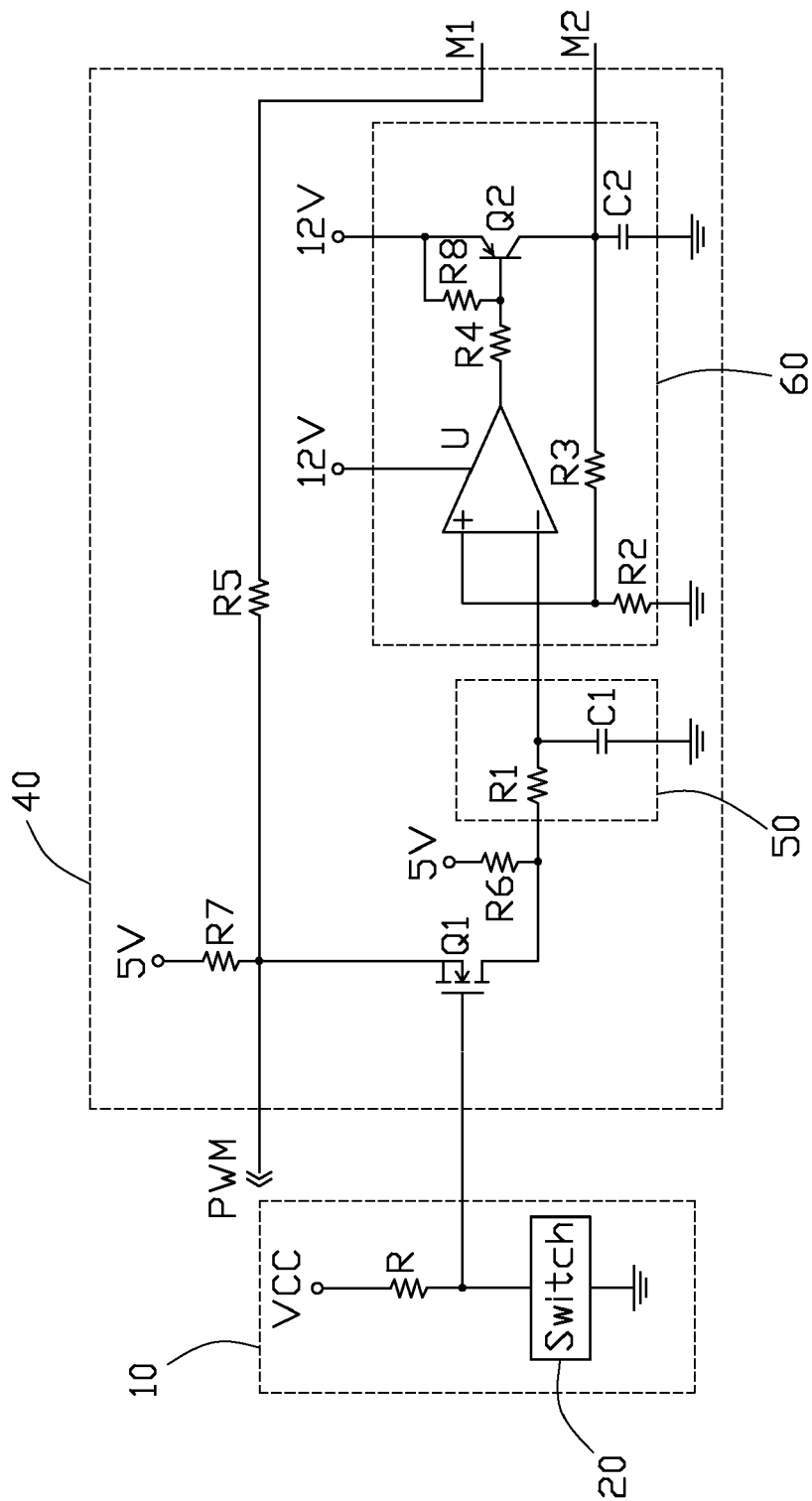
FIG. 2 is a circuit diagram of a device for controlling rotation speed of a computer fan in accordance with an exemplary embodiment of the present invention.

Referring to FIG. 1 and FIG. 2, a device for controlling rotation speed of a computer fan in accordance with an embodiment includes an identifying device 10 and a control circuit 40. The identifying device 10 includes a power supply VCC, a resistor R, and a switch 20 having a control terminal 22 and a ground terminal 24. The control circuit 40 includes an electric switch Q1, an integrated circuit (IC) 50 having a resistor R1 and a capacitor C1, a linear voltage regulating circuit 60 having an amplifier U and a transistor Q2 functioning as a current controller, a first output terminal M1, and a second output terminal M2. In this embodiment, the electric switch Q1 is a negative-metal-oxide-semiconductor (NMOS) transistor, and the transistor Q2 is a positive-negative-positive (PNP) transistor. Typically, the computer fan is connected to a motherboard of a computer by a fan header mounted on the motherboard.

The switch 20 is mounted on a 4-pin fan header which includes a baseplate 5 mounted on the motherboard, and four pins 1~4 mounted on the baseplate 5 and connected to the motherboard. The ground terminal 24 is a sheet of metal and is vertically mounted on the baseplate 5 at the right side of a PWM control pin 4. The control terminal 22 is a sheet of metal and is vertically mounted on the baseplate 5 between the PWM control pin 4 and the ground terminal 24, has a V-shaped upper portion with an opening toward the ground terminal 24, and is connected to the power supply VCC via the resistor R.

The gate of the NMOS transistor Q1 is coupled to a node between the resistor R and the control terminal 22 to receive an identifying signal generated by the identifying device 10. The source of the NMOS transistor Q1 is coupled to a super input/output (I/O) chip to receive a pulse-width modulation (PWM) signal, and is coupled to a 5V power source via a resistor R7. The drain of the NMOS transistor Q1 is connected to the 5V power source via a resistor R6, and is grounded via the resistor R1 and the capacitor C1. In other embodiments, the 5V power source, the resistor R6, and the resistor R7 can be omitted. The amplifier U includes a negative input terminal connected to a node between the resistor R1 and the capacitor C1 to receive an analog voltage signal therefrom, a positive terminal grounded via a resistor R2, an output terminal, and a power terminal connected to a 12V power source. The base of the transistor Q2 is connected to the output terminal of the amplifier U via a resistor R4. The emitter of the transistor Q2 is connected to the 12V power source, and is connected to the base of the transistor Q2 via a resistor R8. The collector of the transistor Q2 is connected to the positive terminal of the amplifier U via a resistor R3, and is grounded via a capacitor C2. The first output terminal M1 is connected to the super I/O chip via a resistor R5, configured to output the PWM signal to the PWM control pin 4 of the 4-pin fan header. The second output terminal M2 is connected to the collector of the transistor Q2, configured to output the analog voltage signal to a power pin 2 of the 4-pin fan header. The connection between the positive input terminal of the amplifier U and the collector of the transistor Q2 forms a negative feedback loop for steadying the circuit.

If a 4-pin fan connector 6 is mounted on the 4-pin fan header before turning on the computer, the 4-pin fan connector 6 will press the upper portion of the control terminal 22 to make the control terminal 22 abut the ground terminal 24, closing the switch 20, and the identifying signal generated by the identifying device 10 is at a low level to turn off the NMOS transistor Q1. The PWM signal is directly transmitted to the PWM control pin 4 of the 4-pin fan header by the first output terminal M1 to control the rotation speed of the computer fan thereafter.

If a 3-pin fan connector (not shown) is mounted on the 4-pin fan header before turning on the computer, the 3-pin fan connector will not touch the control terminal 22 because the 3-pin fan connector has no PWM control pin 4, and because the width of the 3-pin fan connector is shorter than that of the 4-pin fan connector, the switch 20 remains open, and the identifying signal generated by the identifying device 10 is at a high level to turn on the NMOS transistor Q1. The PWM signal is transmitted to the NMOS transistor Q1, and then is converted to an analog voltage signal by the IC 50. The analog voltage signal is transmitted to the negative input terminal of the amplifier U, and then the amplifier U outputs an amplified voltage signal. The transistor Q2 works in an amplification region. Therefore if the current of the base of the transistor Q2 changes, the current change at the collector of the transistor Q2 will change in direct proportion to the current change of the base. Thus a corresponding change occurs to the voltage signal at the collector of the transistor Q2. Because the change of the rotation speed of the computer fan is in direct proportion to the change of the voltage signal of the collector of the transistor Q2, the rotation speed of the computer fan is thus controlled by the PWM signal.

Figure 3:
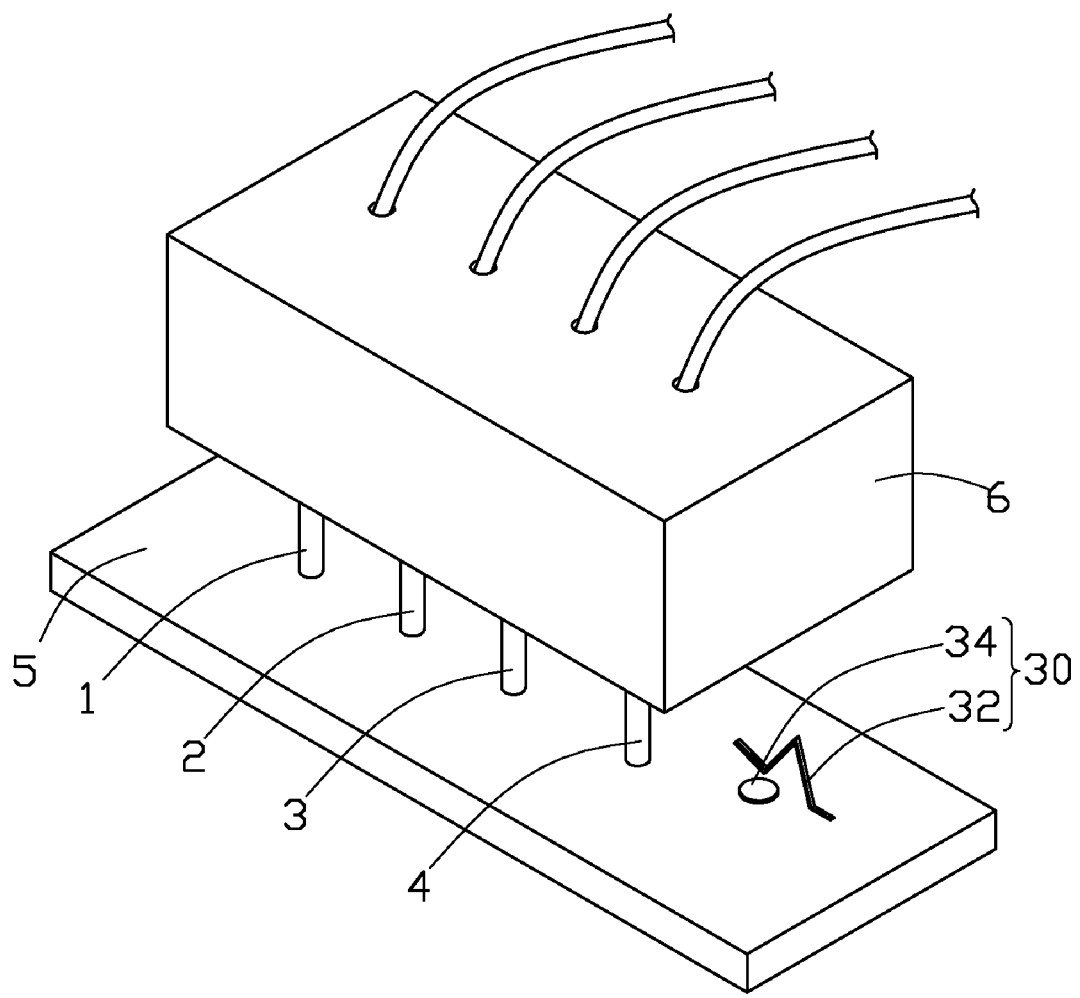
FIG. 3 is an isometric view of a switch installed on the 4-pin fan header in accordance with another embodiment of the present invention.

Referring to FIG. 3, in another embodiment of the present invention, the switch 30 includes a control terminal 32 and a ground terminal 34 mounted on the 4-pin fan header at the right side of the PWM control pin 4. The control terminal 32 is a sheet of metal having an inverted V-shaped middle portion, two flanges extend outwardly and upwardly from lateral free ends of the middle portion, one flange is fixed on the baseplate 5, the other flange forms a free end facing the PWM control pin 4, and the control terminal 32 is connected to the power supply VCC via the resistor R. The ground terminal 32 is a sheet of metal located on the baseplate 5 under the free end of the control terminal 32, and grounded.

In the present embodiment, the identifying device 10 identifies the type of the computer fan according to the state of the switch 30, and the control circuit 40 automatically selects a corresponding circuit to control the rotation speed of the fan according to an identifying signal generated by the identifying device 10. When the 4-pin fan connector 6 is connected to the 4-pin fan header, the 4-pin fan connector 6 will press the free end of the control terminal 32 to downwardly touch the ground terminal 34, closing the switch 30, and the identifying signal is at a low level to turn off the NMOS transistor Q1, and the PWM signal is directly transmitted to the PWM control pin 4 of the 4-pin fan header by the first output terminal M1 to control the rotation speed of the computer fan thereafter. When the 3-pin fan connector is connected to the 4-pin fan header, the switch 30 remains open, and the identifying signal is at a high level to turn on the NMOS transistor Q1, and the PWM signal is transmitted to the NMOS transistor Q1, then is converted to an analog voltage signal transmitted to a power pin 2 of the 4-pin fan header by the second output terminal M2 to control the rotation speed of the computer fan.

It is to be understood, however, that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts within the principles of the invention to the full extent indicated by the broad general meaning of the terms in which the appended claims are expressed.

What is claimed is:

1. A device for controlling rotation speed of a computer fan comprising:
    an identifying device configured for identifying the type of a computer fan, comprising a switch having a control terminal and a ground terminal, the control terminal connected to a power supply via a resistor, the ground terminal grounded; and
    a control circuit configured for controlling rotation speed of the computer fan comprising:
        an electric switch having a first terminal coupled to a node between the first resistor and the control terminal to receive an identifying signal generated by the identifying device, a second terminal coupled to a super input/output (I/O) chip to receive a pulse-width modulation (PWM) signal, and a third terminal;
        an integrated circuit having an input terminal connected to the third terminal of the electric switch, and an output terminal configured to output an analog voltage signal;
        a first output terminal connected to the super I/O chip, configured to output the PWM signal to a PWM control pin of a fan header; and
        a second output terminal configured to output the analog voltage signal to a power pin of the fan header.

2. The control device as claimed in claim 1, wherein the switch is vertically mounted on the fan header at a side of pins thereon, the ground terminal is a sheet of metal, and the control terminal is a sheet of metal having a V-shaped upper portion with an opening towards the ground terminal.

3. The control device as claimed in claim 1, wherein the switch is mounted on the fan header at a side of pins thereon, the control terminal is a sheet of metal having an inverted V-shaped middle portion, two flanges extend outwardly and upwardly from lateral free ends of the middle portion, one flange is fixed on the fan header, the other flange forms a free end facing the PWM control pin, and the ground terminal is a sheet of metal located on the fan header under the free end of the control terminal.

4. The control device as claimed in claim 1, wherein the integrated circuit comprises a resistor and a capacitor connected in series between the input terminal of the integrated circuit and ground, and a node between the resistor and the capacitor acts as the output terminal of the integrated circuit.

5. The control device as claimed in claim 1, wherein the control circuit further comprises a linear voltage regulating circuit, the linear voltage regulating circuit comprises an input terminal connected to the output terminal of the integrated circuit to receive the analog voltage signal, and an output terminal connected to the power pin of the fan header to output a corresponding voltage signal to the power pin.

6. The control device as claimed in claim 1, wherein the fan header is a 4-pin fan header.

7. The control device as claimed in claim 5, wherein the linear voltage regulating circuit further comprises an amplifier and a transistor, a negative terminal of the amplifier acts as the input terminal of the linear voltage regulating circuit, a positive terminal of the amplifier is connected to the collector of the transistor via a resistor, an output of the amplifier is connected to the base of the transistor via a resistor, and the collector of the transistor acts as the output terminal of the linear voltage regulating circuit.

8. The control circuit as claimed in claim 6, wherein the transistor is a PNP transistor.

9. The control circuit as claimed in claim 6, wherein the base of the transistor is connected to the emitter of the transistor via a resistor.

10. The control device as claimed in claim 1, wherein the second and third terminals of the electric switch are connected to a power supply via a resistor.

11. The control device as claimed in claim 1, wherein the electric switch is an NMOS transistor, the first, second, and third terminals are the gate, the source, and the drain of the NMOS transistor respectively.

* * * * *